United States Patent [19]

Morris

[11] 4,115,275
[45] Sep. 19, 1978

[54] SLUDGE DEWATERING APPARATUS
[76] Inventor: William E. Morris, 1831 N. Douglas, Appleton, Wis. 54911
[21] Appl. No.: 787,338
[22] Filed: Apr. 14, 1977
[51] Int. Cl.² .............................................. B01D 33/04
[52] U.S. Cl. .................................. 210/386; 100/119; 210/400; 210/DIG. 3
[58] Field of Search ......... 210/386, 400, 401, DIG. 3; 100/118–121; 162/348, 349, 351, 353, 354, 224, 225, DIG. 9; 209/268, 264, 307; 214/1 Q

[56]  References Cited
U.S. PATENT DOCUMENTS

| | | | |
|---|---|---|---|
| 2,207,278 | 7/1940 | Albrecht | 100/118 X |
| 2,884,062 | 4/1959 | Taylor | 100/120 X |
| 3,274,924 | 9/1966 | Walker | 100/118 X |
| 3,531,404 | 9/1970 | Goodman et al. | 210/400 X |
| 4,042,511 | 8/1977 | Ginaven | 210/386 |

*Primary Examiner*—William A. Cuchlinski, Jr.
*Attorney, Agent, or Firm*—McDougall, Hersh & Scott

[57]  ABSTRACT

Apparatus for dewatering sludge comprising a primary dewatering section in which the sludge is supported on a filter means sloped downwardly towards the center, and a secondary dewatering section which follows the primary dewatering section and through which the sludge is carried on a non-filtering support which is sloped downwardly towards the side, and means for applying pressure onto the top side of the sludge layer during passage through the primary and secondary dewatering sections.

37 Claims, 17 Drawing Figures

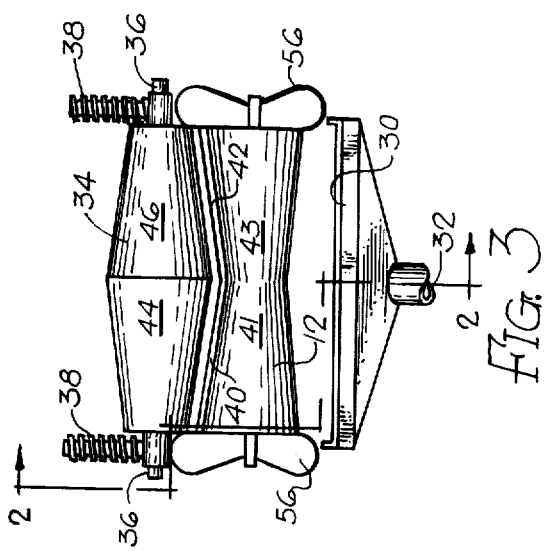
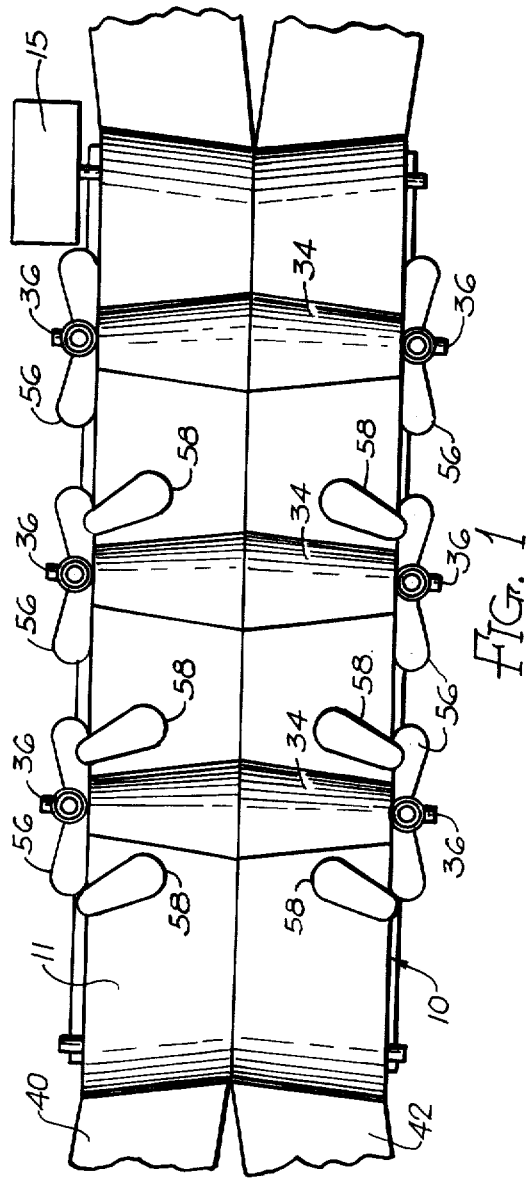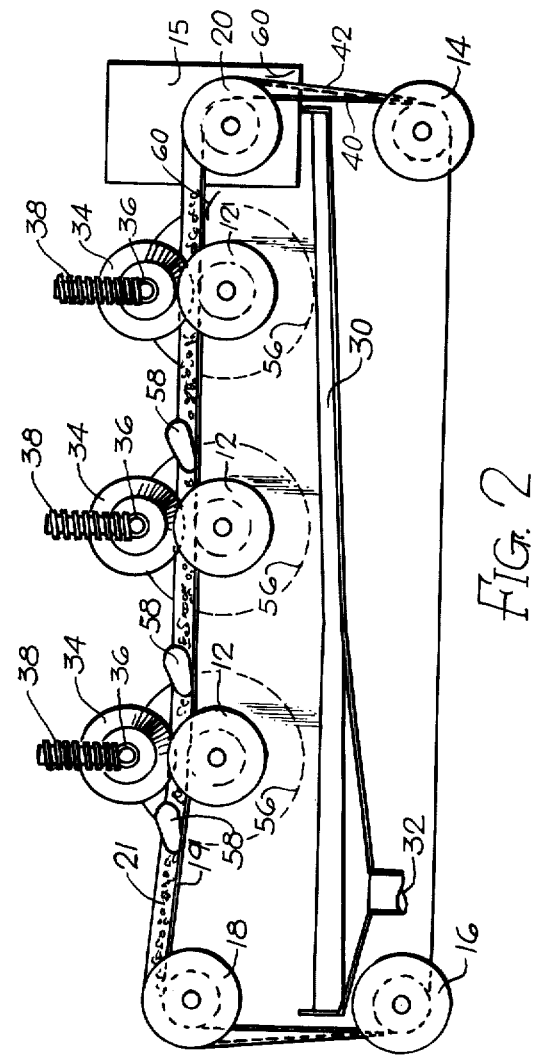

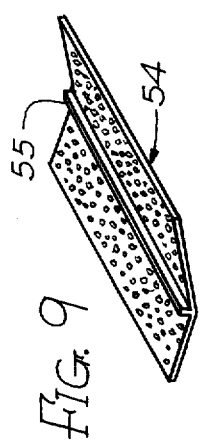
fig. 9
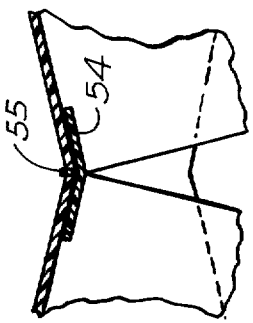
fig. 8
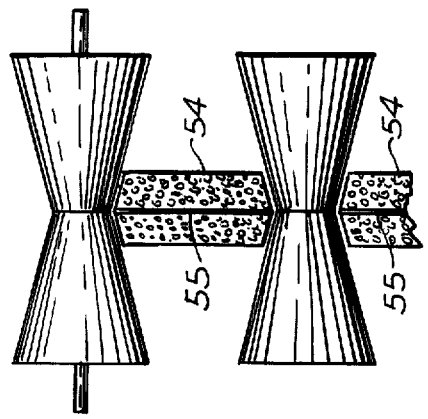
fig. 7
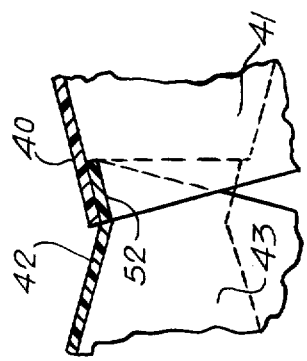
fig. 6
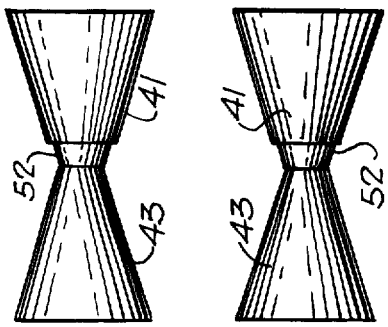
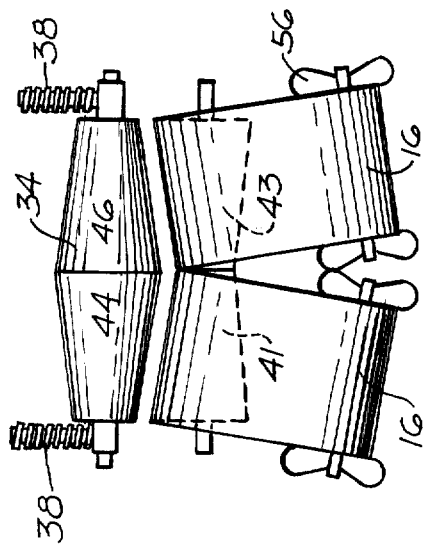
fig. 4
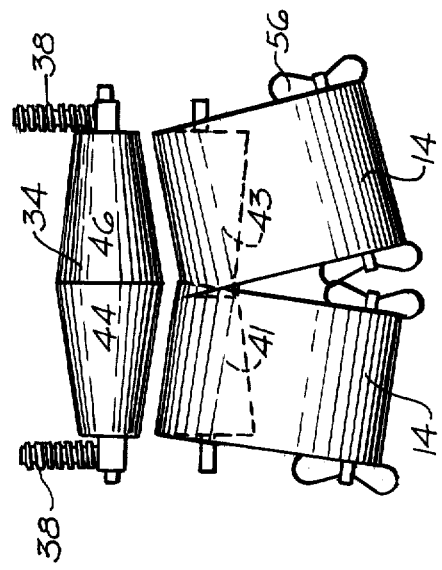
fig. 5

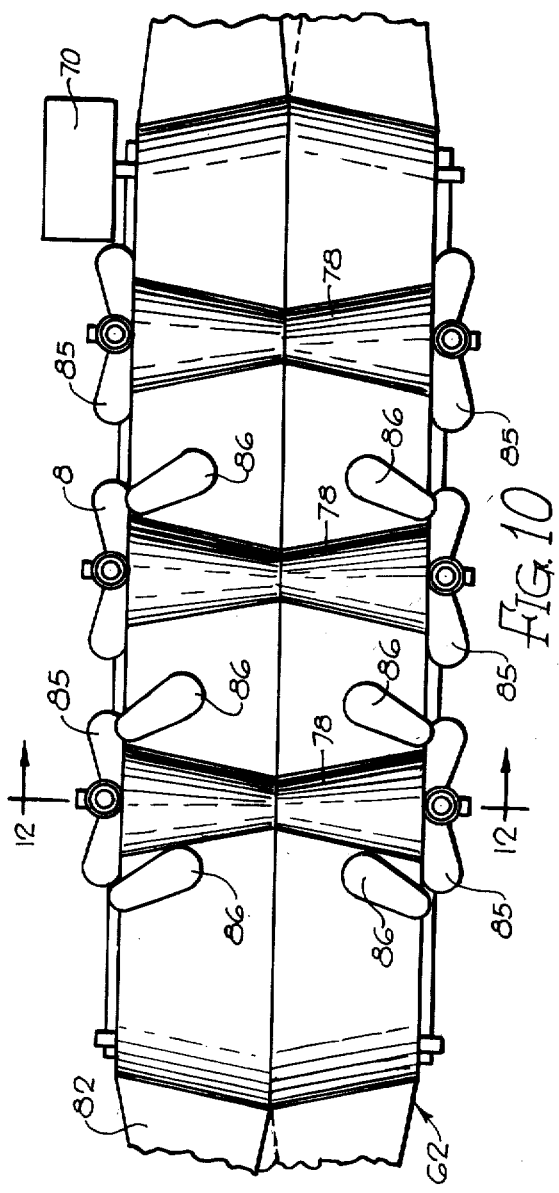
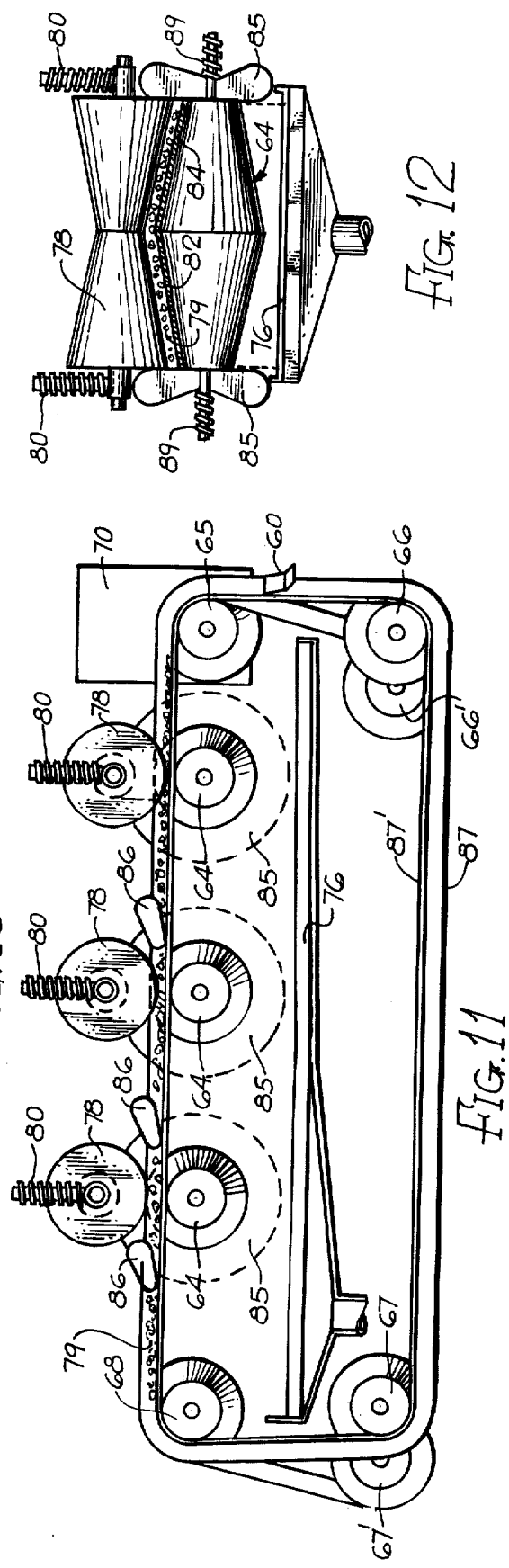

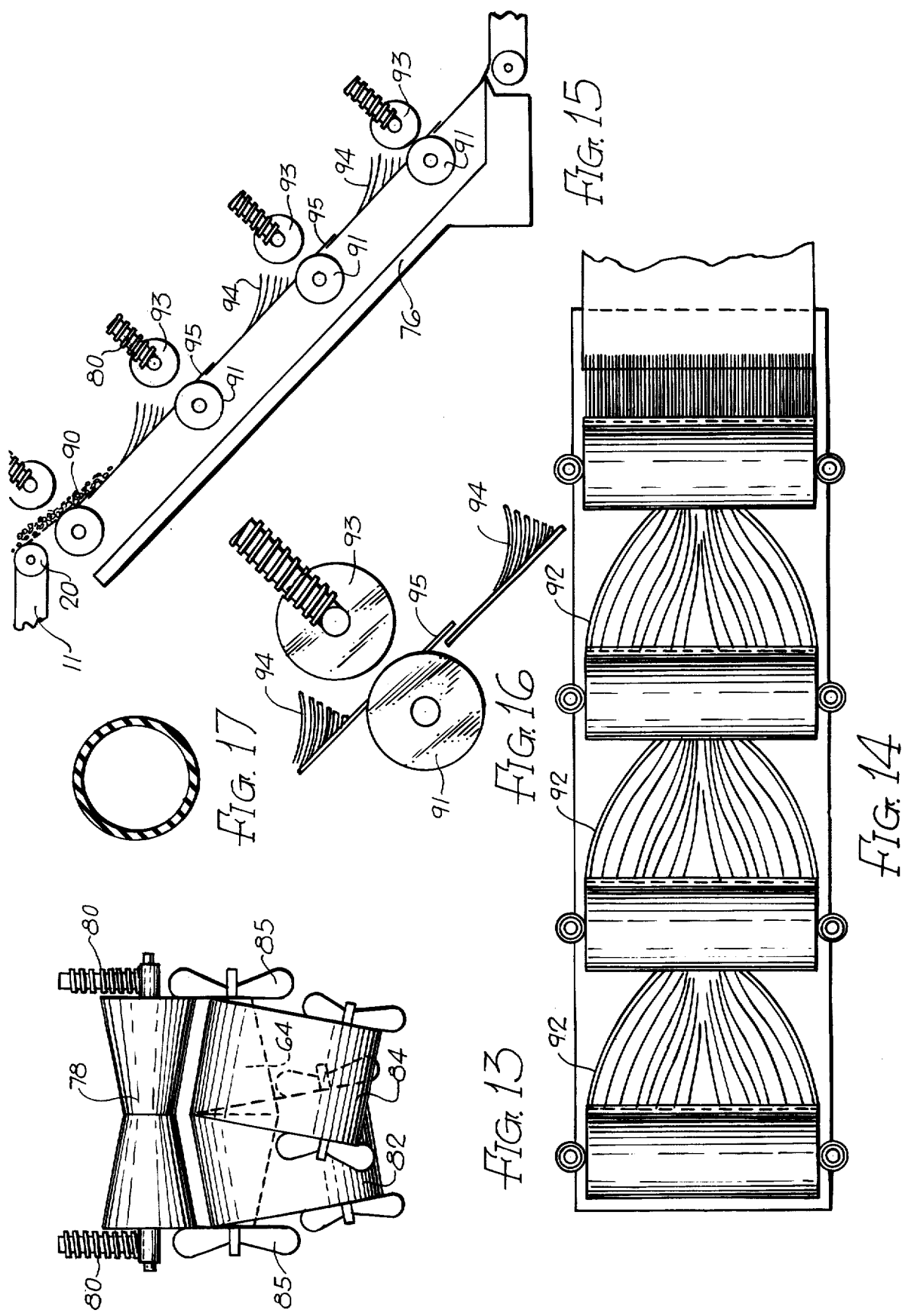

SLUDGE DEWATERING APPARATUS

This invention relates to the treatment of sludge and industrial waste, hereinafter referred to as sludge, to convert the solution to a non-pollutant product capable of easy disposal and having considerable utility.

To the present, such sludge has been disposed of in a number of ways, such as in dumps or land fill. Such means for disposal require the use of considerable care and equipment and often times the amount of sludge that is produced is incapable of being utilized as land fill, with the result that problems of disposal remain. The practice of dumping such sludge in the waters and waterways has been frowned upon because of pollution of the waters and environment.

Sludge derived from sewage or industrial waste, such as the waste in pulp manufacture, usually contains suspended solids present in an amount as low as 0.5 to 5.0% by weight in primary sludge and 0.5 to 2% by weight in secondary sludge. It is desirable to dewater the sludge for removal of water in amount to produce a product wherein the water content has been reduced to a level wherein a self-sufficient product is secured that is capable of sustaining combustion so that it can be utilized as an energy source while, at the same time, providing a means for handling for disposal without the problem of contamination or pollution of the natural resources, such as air, water and soil.

In the removal of water from sludge of the type described, a number of systems have been employed, such as pressure and vacuum filters, capillary filters, centrifugal separators, thickeners and screen operations, and combinations of the above. All of these suffer from a number of problems, such as clogging of the filter area, and rapid and heavy wear of equipment. In addition, the amount of water capable of being removed by processes of the type described still leaves the dewatered sludge in a condition difficult to handle and to dispose of and it is still usually too wet to utilize as a combustible material for the recovery of heat and energy.

It is an object of this invention to provide a method and apparatus for the treatment of sludge and other industrial waste in dilute suspension in aqueous medium to remove water and correspondingly to increase the solid content whereby the dewatered sludge is reduced to a product having some degree of self-sufficiency to enable handling in an efficient and economical manner for disposal or otherwise in treatment to recover valuable components thereof, and whereby the dewatered sludge is reduced to a product that is capable of supporting combustion to enable use of a source of heat or energy with coincident disposal in a profitable manner, without raising problems of contamination or pollution.

These and other objects and advantages of this invention will hereinafter appear and for purposes of illustration, but not of limitation, embodiments of the invention are shown in the accompanying drawings, in which —

FIG. 1 is a top plan view of the primary section for dewatering sludge in accordance with the practice of this invention, with portions of the frame structure deleted for better illustration;

FIG. 2 is an elevational view of the apparatus shown in FIG. 1;

FIG. 3 is a sectional elevational view through a roller pair shown in the primary dewatering section of FIGS. 1 and 2;

FIG. 4 is an elevational view from the head end of the primary dewatering section;

FIG. 5 is an elevational view from the tail end of the primary dewatering section;

FIG. 6 is a sectional view showing the arrangement of the belts in the top run of the primary dewatering section;

FIG. 7 is a top plan view of a modification in the primary dewatering section;

FIG. 8 is a sectional view of a fragmentary portion of the central portion between the rollers in the modification of FIG. 7;

FIG. 9 is a perspective view of the support plate;

FIG. 10 is a top plan view of the secondary dewatering section embodying features of this invention;

FIG. 11 is a side elevational view of the secondary dewatering section of FIG. 10;

FIG. 12 is a sectional view taken along the lines 12-12 of FIG. 10;

FIG. 13 is an end elevational view of the secondary dewatering section of FIGS. 10-12;

FIG. 14 is a top plan view of a modified form of secondary dewatering section embodying features of this invention;

FIG. 15 is a side elevational view of the modification shown in FIG. 14;

FIG. 16 is an enlarged side elevational view of a portion of the modification shown in FIGS. 14 and 15; and FIG. 17 is a sectional view through a support roller usable in the primary and secondary dewatering sections.

In the following description and in the drawings, such elements as the frame and means for support of the elements to be described therein will be eliminated for the sake of a clearer illustration of the members involved in the practice of this invention, it being understood that the construction of a suitable frame and support are matters of good engineering design, well known to the skilled in the art.

The invention will be described with reference to dewatering paper mill sludge normally calculated to contain about 97-98% by weight water and other liquids in minor amounts, with the remainder comprising suspended solids, mostly pulp fibers.

The process and apparatus of this invention combines a primary dewatering section wherein the solids content is increased from about 2-3% by weight to about 15-20% by weight by the removal of water, and a secondary dewatering section arranged as a continuation of the primary dewatering section, wherein the dewatered sludge from the primary dewatering section passes directly to the secondary dewatering section where an amount of water is removed to increase the solids content to about 50-60% or more by weight, yielding a product having mass integrity for self-sufficiency and a moisture content that enables combustion without the need for the use of additional fuels.

Referring now to the drawings, the primary dewatering section comprises an endless filter member 10, the upper run 11 of which rides upon a series of crosswise extending, longitudinally spaced supporting rollers 12 mounted at their ends in bearings (not shown) for free rotational movement, with the bearing blocks fixed in the desired spaced relation on a rigid frame. The endless filter member 10 is trained about idler rollers 14, 16, 18 and 20, the latter comprising a roller driven by a variable speed electrical motor 15, or by a motor connected by a belt to a pulley fixed onto the end of the shaft supporting the roller 20. Lead-in roller 18 is at a level above the rollers 12 to provide an apron 19 having a downward slope and onto which the sludge 21 to be dewatered is fed.

Underlying the top run of the filter member 10 but above the lower run is an elongate drain pan 30, which is supported by the frame for receiving the water or other fluid filtering through the filter member and which is inclined in one direction to cause the collected water to flow to one end of the pan for removal through a drain pipe 32.

A series of pressure rollers 34 are mounted on the frame in longitudinally spaced apart relation above the top run 11 of the filter member 10, preferably in vertical alignment with the supporting rollers to form pressure roller couples between which the top run of the filter member passes, preferably with the spaced relation between the pressure rollers and the supporting rollers decreasing from the head end to the tail end of the upper run in a manner to increase the pressure on the sludge as it progresses from the head end to the delivery end of the primary dewatering section.

The shafts 36 of the pressure rollers 34 are mounted in bearings for free rotational movement and the bearing housings are mounted in vertical slots in the frame member to enable vertical adjustment. The bearings are constantly urged in the direction towards their lowered position of adjustment by compression springs 38 fixed at one end to the bearing housing and at their upper ends to fixed supports on the machine frame.

The filter member is preferably in the form of an endless belt woven of fibers such as nylon, dacron, polyester, steel, or glass fibers, and preferably of a mono-filament fiber to minimize clogging of the filter openings and the like.

In the primary dewatering section, the filter member is designed with a downward slope from the lateral edge portion to the center so that the rolls will stay in place while under fluid pressure and to cause the sludge to drain into the central trough thus formed thereby to minimize run-off while the sludge is in a fluid state and to give more effect to the pressure applied by the rollers 34. In order to achieve the desired inclination towards the center of the filter member, without placing excessive strain on the filter member otherwise due to the differences in travel between the outer end portions and the center, when formed of one piece, the filter member is formed of two belts 40 and 42 arranged in side by side relation to provide a continuous support therebetween for the sludge carried on the surfaces thereof through the primary dewatering section.

As illustrated in FIGS. 3 and 4, the supporting rollers 12 are formed with a downward slope from the lateral edges to the center to provide a central trough. For this purpose, the supporting filters are in the form of a pair of frustoconical sections 41 and 43 joined with their minimum diameters at the center, and with a cone angle within the range of 5°-25° and preferably 10°-15°.

The pressure rollers 34, which cooperate with the supporting rollers 12 to apply pressure to the sludge during passage between the roll couples, are similarly formed of a pair of frustoconical sections 44 and 46 of substantially the same dimension, with the frustoconical sections being joined with their maximum diameter at the center and having cone angles corresponding to those of the supporting rollers so that the pressure rollers will more or less nest with the supporting rollers of the roll couple with a desired spaced relationship therebetween. Lines formed by the roll couple at the nip will be spaced one from the other in substantially parallel relation in the form of an open V having an obtuse angle of about 170°-140°.

The filter member is subdivided into at least two belts 40 and 42 arranged in side-by-side relation during travel along the upper run over the supporting rollers. One of the belt sections 40 rides on half 41 of the supporting roller at the angle of inclination thereof while the other belt section 42 rides on the other half 43 of the supporting roller at the corresponding angle of inclination. The idler rollers 16 and 14 are mounted in laterally spaced pairs to rotate about axes corresponding to the respective cone angles, in parallel relation with the profile of the support rollers on the top side, so that a plane passing through the center of a filter belt will be substantially perpendicular to the angle of inclination of the respective belt section along the upper run. Thus the distance traveled by a belt across its width will be substantially the same thereby to avoid tension and wear which would otherwise occur during travel of a belt with a curvilinear contour in cross-section.

In order to provide for continuity of the filter member along the upper run, it is desirable to dimension one or both of the belts 40 and 42 to have a width sufficient to provide an overlap at the center, as illustrated in FIG. 6, or so that they meet at the center, as illustrated in FIG. 8. In the first instance, it is desirable to provide a groove 52 in the center portion of the support rollers having a depth corresponding to the thickness of the belt and a width corresponding to the amount of overlap so that a portion of the overlap will rest within the groove thereby to provide for a continuous top surface along the top run. In the latter instance, illustrated in FIG. 8, elongate plates 54 are provided between the adjacent compression rollers to underlie the meeting edge portions of the belt members, with the plate having a width to underlie adjacent portions of the belts to prevent leakage therebetween in the event of separation and preferably with a rib 55 along the center for maintaining the separated relation between the filter belts.

The support rollers 12 are each provided with a collar 56 on the end portions in position to engage the lateral edges of the filter members. The collar serves to retain the sludge while in the fluid state to within confines of the rollers to maximize exposure of the sludge to pressure during passage between roll couples.

Plows 58, in the form of curvilinear members, are longitudinally spaced along the lateral edges of the filter belts, in the area between the rollers. The plows serve to intercept the sludge migrating towards the lateral edges of the belt and to fold the sludge back towards the center of the trough before entry into the pressure zone between the roll couples. The plows also serve to knead the sludge and to work the sludge in a manner to enhance the release of water.

Doctor blade 60 is positioned to engage the underside of the supporting belts while over the drain pan 30 to effect removal of material which tends to cling to the underside of the belt and to discharge the material into the drain pan.

The secondary dewatering section, which follows the primary dewatering section, for receipt of the partially dewatered sludge from the primary dewatering section comprises an endless flexible member 62 which rides over a series of crosswise extending, longitudinally spaced supporting rollers 64 mounted for free rotational movement in bearing blocks (not shown) as in the manner described in the primary dewatering section. The endless member 62 is trained about idler rollers 65, 66, 67 and 68, in which preferably 65 is a driving roller and another a tensioning roller for adjustment of the tension of the endless supporting member. The driving roller can be powered directly by a variable speed electrical motor 70 or by an electrical motor connected by a driving belt to a sheave on the shaft of the idler roller 65.

Removal of water in the secondary dewatering section is not intended to be achieved by a filtering action. Instead, the endless supporting member is preferably in the form of a non-filtering belt of non-porous rubber, or rubber-like plastic material. Removal of water for dewatering the sludge in the secondary dewatering section is achieved by the application of pressure at the surface of the sludge layer as it passes lengthwise with the supporting member through the dewatering section and by causing the water squeezed from the sludge to flow laterally over the sides of the belt into a collecting pan 76 underlying the top run of the belt.

For this purpose, the supporting rollers are formed with a downward slope from a crest at the center to the lateral edges of the roller. For this purpose, the supporting rollers are in the form of a pair of frustoconical sections joined with their maximum diameter at the center and with a cone angle within the range of 5°-25° and preferably 10°-15°.

Pressure is applied by a series of pressure rollers 78 with one pressure roller vertically aligned with a supporting roller and contoured directly opposite to that of the supporting roller so as to define a pair of conical sections joined with their minimum diameters at the center and having cone angles corresponding to those of the supporting rollers.

As in the primary dewatering section, the pressure rollers are supported at their shaft ends in bearing blocks that are mounted for vertical sliding movement in frame members of the machine with means such as coil springs 80 or cylinders or the like constantly to urge the bearing blocks and pressure rollers in the direction towards the support rollers. Thus the upper pressure rollers 78 are equipped with pressure means, such as springs, designed to maintain a constant preset pressure on the layer 79 of sludge passing with the support member between roll pairs. The pressure rollers and their bearing supports are provided with stop means in order to maintain a predetermined spaced relation with the supporting roller of the pair. As in the primary dewatering section, the spaced relation between the rolls in the pairs preferably decrease from the head end of the dewatering section to the tail end to compensate for the decrease in the thickness of the layer of sludge as it advances through the dewatering section and to increase the pressure as the layer 79 advances from the head end to the delivery end of the secondary dewatering section.

Roll pairs shaped in the manner described cannot be traversed with a single belt without excessive strain that soon leads to deterioration of the belt. In order to provide for travel of the belt over rollers contoured in the manner described, the belt is again formed of two or more separate members in side-by-side relation, thus one belt 82 turns about an axis which is parallel with the inclination at the top side of one conical section of the roller while the other belt 84 turns about an axis which is parallel with the line formed at the nip of the other conical section of the roller with the idler rollers 66 and 67 mounted in spaced pairs for rotational movement about the same inclined axes.

Because of the downward slope from the crest at the center to the lateral edge, the lower runs of the belts will tend to cross each other and therefore must travel at different levels. Thus the lower run 87 of one belt is at a level differing with the lower run 87' of the other belt with the lower runs being parallel to the corresponding top runs. In this arrangement, it is desirable to drive the belts by making use of one of the idler rolls 65 or 67 as the drive roller connected directly to a driving motor or else connected by a belt or pulley to a driving motor mounted on the frame, as previously described.

The supporting rollers 64 may be mounted for rotational movement along the same level, but it is preferred to raise the level of the supporting rollers 15°-30° from the horizontal whereby the top run of the belt will assume the same angle of rise from the head end to the tail end.

The upper squeeze rollers 78 may be separately powered for rotational movement but it is preferred to avoid the use of a separate power source and to let the rollers revolve in response to the engagement with the moving layer of sludge and the pressure conditions existing between the sludge layer and roller. It will be seen that the upper squeeze rollers 78 are not fixed in position. Instead they are allowed to float vertically within their supports to allow obstructions, such as nuts and bolts, to pass between the rollers. To avoid slippage on the wet sludge, the upper pressure rollers in both the primary and secondary dewatering sections can be formed with surface roughness or with layers 90 of friction material such as a rubber coating or the like, as shown in FIG. 17.

Collars 85, in the form of disc members, are mounted on the shafts alongside the lateral edges of the supporting rollers 64. The disc members 85 are dimensioned to have a radius at the outer end of the supporting rollers plus the spaced relation between the supporting roller and the aligned pressure or squeezing roller so that the collar will span the space between the rollers and project into crosswise alignment with a portion of the outer edge of the pressure roller. The outer end portion of the collars are preferably formed with a backward curvature at least in the area lying in the path of the pressure rollers. A similar collar arrangement is also preferably provided at the ends of the supporting rollers in the primary dewatering section.

The collars serve to guide the pressure rollers into position of use and they also serve to redirect the sludge back into the area between the rollers thereby to minimize leakage over the edge of the belts. In a preferred practice of the invention, the collars 85 can be mounted on the roller shaft for relative axial movement with means, such as coil springs 89, resiliently to urge the collars into engagement with the lateral edges of the support and pressure rollers.

Plows 86, similar to those described in connection with the primary dewatering section, are provided along the lateral edge portions of the belt in the area between roller pairs to engage portions of the sludge layer along the outer edge and to plow back such material towards the center of the belt. The plows also serve to turn over the sludge and provide a type of mixing or masticating action which is effective to free more of the water for removal.

In the modification shown in FIGS. 14-16, reliance is had on the self-sufficiency of the dewatered layer of sludge as delivered from the primary dewatering section. Separate supports, such as belts, are eliminated as the partially dewatering layer is displaced by flat rolls 91 and 93 of roll pairs through the secondary dewatering section.

Instead, the partially dewatered sludge layer 90 is deposited onto an apron which guides the sludge layer into the nip of the first roll pair. A doctor blade 95 tangentially engages the downstream side of each supporting roll to insure release of the compressed layer of sludge issuing from between the roll pair and for guiding the sludge layer onto spaced apart tines 92 having upwardly curved end portions 94 which serve to permit drainage of water between the tines while supporting the partially dewatered sludge in a manner to turn the sludge during advancement towards the next roll pair. Thus a freshly formed mixture of sludge is exposed to the pressure of the roll. This operates to open the sludge layer and facilitate the release of water during subsequent travel and subsequent compression between the oncoming roll pair.

Because the sludge layer is displaced linearly through the secondary dewatering section, in the modification shown in FIGS. 14–16, it is desirable to maximize the use of the gravity to maintain the integrity of the layer and to reduce the forces to a minimum for transport of the layer through the secondary dewatering section. For this purpose, it is desirable to mount the supporting rollers and the cooperating pressure rollers at a relatively sharp downward incline from the head end to the delivery at the tail end. A downward incline within the range of 10°–50° can be employed but it is preferred to provide for an angle of inclination within the range of 20°–40° with the horizontal. Such unsupported system finds best use when the fibrous component of the sludge is in the form of long fibers which enhance integrity of the mass.

By the time that the sludge layer reaches the end of the secondary dewatering section, the integrity of the layer is such that it can be handled as an endless sheet to be rolled into packages, cut into cakes or panels, or chopped into segments.

In operation, paper mill sludge, in the form of pulp having a solids content of about 2.5% by weight, is fed at a constant rate of flow onto the apron at the head end of the filter belts of the primary dewatering section. Water immediately begins to drain through the filter belts into the collecting pan underneath.

The sludge continues to drain as it passes with the belt between the roll pairs which apply increasing amounts of pressure onto the sludge layer.

At this stage, where the solids content of the sludge is reduced from the original of about 2.5% by weight to about 15-20% by weight, the sludge is rather sloppy and, because of the slope of the roller supported belts, the sludge tends to flow inwardly into the trough that is provided in the central portion. Such flow is aided by the plows which divert the sludge from the lateral edge portions of the belts towards the center while providing a mixing action which facilitates the release of water from the sludge layer.

The water that filters through, in the primary dewatering section, falls gravitationally into the underlying pan and is discarded or otherwise re-used in the paper mill for admixture with fresh pulp to form the slurry fed to the paper making machine.

The doctor blades, in engagement with the underside of the filter members, free the underside of the filter members from collected solids in order to keep the filter openings free for drainage during dewatering of the sludge. The decreased spaced relation between the pairs of squeeze and support rollers is effective to pressure the sludge during passage between the roll pairs to squeeze water from the sludge under increasing pressure.

The volume of sludge processed through the dewatering system can be controlled either by the rate of feed onto the apron of the filter member and/or by the linear speed of the filter member, both of which can be separately adjusted to control throughput and the thickness of the layer of sludge on the filter surface during passage through the primary dewatering section.

By the time that the sludge has traversed the primary dewatering section, the solids content has been increased to within the range of 15-20% by weight. Under these conditions, the layer of sludge will acquire some degree of self-sufficiency so that it can be trained for passage from the tail end of the primary dewatering section directly onto the apron formed of the belts of the secondary dewatering section. However, it is desirable to provide a doctor blade at the end of the primary dewatering section to lift the sludge layer off the endless filter member and onto the apron of the belts of the secondary dewatering section.

The volume of material processed through the secondary dewatering section will of course be controlled by the volume delivered from the primary dewatering section. As the layer of sludge traverses the secondary dewatering section, the increasing pressure applied by the sequence of pressure roller couples will operate to iron out the layer so that it will tend to spread crosswise over the surfaces of the supporting belts and to squeeze the water from the sludge which then flows down the inclined surfaces of the belts laterally to overflow the edges into the underlying pan.

The plows prevent buildup of sludge in the outer edge portions of the belt. In addition, the plows lift the sludge from the lateral edge portions and fold the material over onto the inner portions of the layer to provide a type of kneading action which, coupled with the pressure applied during passage between the rollers, frees large amounts of water for removal from the sludge.

The collars serve to center the pressure rollers and to block extrusion of the sludge beyond the lateral edges of the belt. As previously described, the resilient support for the pressure rollers allows the rollers temporarily to part in the event that an obstruction is encountered in the sludge layer during travels of the roll pair.

As illustrated, the belts are arranged preferably to travel along a downward or upward incline and to permit removal of the dewatered sludge from the end of the secondary dewatering section as a relatively solid product having a solids content that has been increased to above 50% and preferably above 60% by weight. Under these conditions, the solid product can be reduced to segments which can be easily handled and which are capable of supporting combustion to enable recovery of heat and energy thereby to provide a safe and economical means for disposal of sludge.

The apparatus and process described is substantially self-sustaining in that utilization can be made of energy contained in the sludge for operation of the plant with some energy usually left over for distribution or sale. The system described represents an energy conservation system in which energy can be recovered without undesirable contamination or pollution of natural resources, while at the same time providing a means for treatment of waste that otherwise presents disposal problems.

It will be understood that changes may be made in the details of construction, arrangement and operation, without departing from the spirit of the invention, especially as defined in the following claims.

I claim:

1. Apparatus for dewatering sludge comprising a primary dewatering section and a secondary dewatering section which immediately follows the primary dewatering section, said primary dewatering section having an endless filter means sloped inwardly to form a central trough along the top run on which the sludge is carried through the primary dewatering section for drainage of water through the filter means, pressure rollers extending crosswise of and longitudinally spaced above the top run of the filter means and operative to apply pressure onto the sludge during passage through the primary dewatering section, and means for feeding the sludge onto the head end portion of the endless filter means, said secondary dewatering section having an endless non-filtering means contoured to slope downwardly towards the side along the top run for drainage of water over the sides of the endless member on which the sludge is supported during travel through the secondary dewatering section, pressure rollers extending crosswise and longitudinally spaced above the top run of the non-filtering member and operative to apply pressure to the sludge during passage through the secondary dewatering section, means for conveying the sludge from the primary dewatering section to the head end portion of the non-filtering member, and means for driving the endless filter means and endless non-filtering member in the primary and secondary dewatering sections respectively.

2. Apparatus as claimed in claim 1 which includes a plurality of crosswise extending, longitudinally spaced support rollers in the primary dewatering section which support the top run of the endless filter means during passage through the primary dewatering section.

3. Apparatus as claimed in claim 2 in which the support rollers taper inwardly from the lateral edges toward the center.

4. Apparatus as claimed in claim 3 in which the support rollers define a pair of frustoconical sections joined at their base of smallest dimension and in which the frustoconical sections define cone angles within the range of 5°-25°.

5. Apparatus as claimed in claim 4 in which the frustoconical sections have cone angles within the range of 10°-15°.

6. Apparatus as claimed in claim 2 in which the pressure rollers taper inwardly from a base at the center in a manner opposite to that of the support rollers to enable the pressure rollers to nest within the support rollers with a spaced relation at the nip formed therebetween.

7. Apparatus as claimed in claim 6 in which the pressure rollers define a pair of frustoconical sections joined at their base of largest dimension.

8. Apparatus as claimed in claim 7 in which the frustoconical sections have a cone angle within the range of 5°-25°.

9. Apparatus as claimed in claim 7 in which the frustoconical sections have a cone angle within the range of 10°-15°.

10. Apparatus as claimed in claim 2 which includes collars alongside the support rollers to cradle the pressure rollers and to provide any barrier to the overflow of sludge.

11. Apparatus as claimed in claim 2 which includes collars alongside the support rollers to cradle the pressure rollers in the secondary dewatering section.

12. Apparatus as claimed in claim 3 in which the endless filter means comprises a pair of filter belts arranged in side-by-side relation along their top run, with one filter belt riding on one half of the supporting roller at the same cone angle while the other rides on the other half of the supporting roller at the corresponding cone angle.

13. Apparatus as claimed in claim 12 in which the filter belts overlap at their inner edge portions along the top run to define a continuous filter surface therebetween.

14. Apparatus as claimed in claim 12 which includes an elongate plate underlying the inner edges of the filter belt to prevent escape of sludge therebetween during travel through the primary dewatering section.

15. Apparatus as claimed in claim 1 in which the spaced relation between the pressure rollers and support rollers decreases from the head end to the tail end of the primary dewatering section.

16. Apparatus as claimed in claim 1 which includes plows spaced longitudinally along the lateral edges of the top run of the filter means, between adjacent pressure rollers in the primary dewatering section for displacing sludge from the lateral edges towards the center of the filter means during passage through the primary dewatering section.

17. Apparatus as claimed in claim 1 which includes resiliently urging the pressure rollers in the direction towards the top run of the filter means.

18. Apparatus as claimed in claim 1 which includes a drain pan underlying the top run of the filter means for collecting liquid filtering through said filter means.

19. Apparatus as claimed in claim 1 which includes a wiper blade in engagement with the underside of the top run of the filter means to remove solids retained by the underside of the filter means.

20. Apparatus as claimed in claim 1 in which the top run of the filter means is sloped downwardly from the head end to the tail end.

21. Apparatus as claimed in claim 1 in which the filter means is at a higher level at the head end portion than the remainder to provide an apron having a downward slope on which the sludge is fed.

22. Apparatus as claimed in claim 1 which includes a plurality of crosswise extending longitudinally spaced support rollers in the secondary dewatering section to support rollers in the secondary dewatering section to support the top run of the non-filtering support during passage through the secondary dewatering section.

23. Apparatus as claimed in claim 22 in which the support rollers taper downwardly from an apex at the center.

24. Apparatus as claimed in claim 23 in which the support rollers define a pair of frustoconical sections joined at their base of largest dimension.

25. Apparatus as claimed in claim 24 in which the frustoconical sections have a cone angle within the range of 5°-25°.

26. Apparatus as claimed in claim 24 in which the frustoconical sections have a cone angle within the range of 10°-15°.

27. Apparatus as claimed in claim 24 in which the endless non-filtering member comprises a pair of non-porous belts arranged in side-by-side relation along their top run with one belt riding on one half of the supporting roller at the same cone angle while the other rides on the other half of the supporting roller at the corresponding cone angle.

28. Apparatus as claimed in claim 22 in which the spaced relation between the pressure rollers and support rollers decreases from the head end towards the tail end of the secondary dewatering section.

29. Apparatus as claimed in claim 23 in which the pressure rollers taper inwardly from the lateral edges in a manner opposite to that of the support rollers for nesting with the support rollers with a spaced relation at the nip formed therebetween.

30. Apparatus as claimed in claim 29 in which the pressure rollers define a pair of frustoconical sections joined at their base of smaller dimension.

31. Apparatus as claimed in claim 30 in which the frustoconical sections have a cone angle within the range of 5°–25°.

32. Apparatus as claimed in claim 1 which includes plows longitudinally spaced along the lateral edges of the top run of the non-filtering member for displacing sludge from the lateral edges towards the center during passage through the second dewatering section.

33. Apparatus as claimed in claim 1 which includes means resiliently urging the pressure rollers in the secondary dewatering section in the direction towards the pressure rollers.

34. Apparatus as claimed in claim 1 which includes a drain pan underlying the non-filtering member in the secondary dewatering section to collect water draining over the sides of the non-filtering member.

35. Apparatus for dewatering sludge comprising a primary dewatering section and a secondary dewatering section which immediately follows the primary dewatering section, the primary dewatering section having an endless filter means contoured to form a central trough along the top run on which the sludge is carried through the primary dewatering section for drainage of water through the filter member, pressure means extending crosswise of and longitudinally spaced above the top run of the filter means and operative to apply pressure onto the sludge carried on the top run of the filter means, and means for feeding the sludge onto the head end portion of the endless filter member, the secondary dewatering section comprising a series of longitudinally spaced roll pairs comprising a lower support roller and an upper compression roller, means for leading the sludge layer from the primary dewatering section into the first of the roll pairs of the secondary dewatering section, inserting a doctor blade adjacent the downstream side of each supporting roll for separating the compressed layer of sludge from the roll and for guiding the sludge layer downstream towards the next roll pair, said sludge layer having sufficient mass integrity for passage from one roll pair to the next without intermediate support, said roll pairs being arranged at a descending angle of from 10°–50° from the head end to the tail end.

36. Apparatus as claimed in claim 35 in which the roll pairs are arranged at a descending angle within the range of 20°–40°.

37. Apparatus for dewatering sludge comprising a primary dewatering section and a secondary dewatering section which immediately follows the primary dewatering section, the primary dewatering section having an endless filter means contoured to form a central trough along the top run on which the sludge is carried through the primary dewatering section for drainage of water through the filter member, pressure means extending crosswise of and longitudinally spaced above the top run of the filter means and operative to apply pressure onto the sludge carried on the top run of the filter means, and means for feeding the sludge onto the head end portion of the endless filter member, the secondary dewatering section comprising a series of longitudinally spaced roll pairs comprising a lower support roller and an upper compression roller, means for leading the sludge layer from the primary dewatering section into the first of the roll pairs of the secondary dewatering section, said sludge layer having sufficient mass integrity for passage from one roll pair to the next without intermediate support, said roll pairs being arranged at a descending angle of from 10°–50° from the head end to the tail end, which includes laterally spaced apart tines having upturned trailing ends in endwise alignment with the outgoing side of intermediate roll pairs in the secondary dewatering section to guide the sludge layer with an overturning movement into the next roll pair.

* * * * *